United States Patent [19]

Hoffmann, Sr.

[11] 4,135,017

[45] Jan. 16, 1979

[54] LAMINATE PATCH

[76] Inventor: Dennis Hoffmann, Sr., 509 Valley View Dr., Wildwood, Ill. 60030

[21] Appl. No.: 859,699

[22] Filed: Dec. 12, 1977

[51] Int. Cl.² ............................................. B32B 35/00
[52] U.S. Cl. ....................................... 428/78; 52/514; 156/94; 428/40; 428/63
[58] Field of Search ............... 52/514; 156/94, 98; 428/63, 78, 912, 538, 40; 29/401 D, 401 E; 144/310 A, 310 B, 310 R

[56] References Cited

U.S. PATENT DOCUMENTS

| | | | |
|---|---|---|---|
| 1,044,323 | 11/1912 | Wiggin | 428/151 |
| 1,669,541 | 5/1928 | Spreen | 428/63 X |
| 2,226,589 | 12/1940 | Smyers | 428/907 X |
| 2,598,194 | 5/1952 | Shippey | 52/514 |
| 2,638,774 | 5/1953 | Wieman | 52/514 |
| 2,833,327 | 5/1958 | Boyce | 428/63 X |
| 2,997,416 | 8/1961 | Helton | 52/514 X |
| 3,049,836 | 8/1962 | Weissman | 428/63 X |
| 3,205,972 | 9/1965 | Stricker et al. | 428/78 X |
| 3,325,955 | 6/1967 | Haut | 52/514 |
| 3,470,048 | 9/1969 | Jones | 156/94 |
| 3,690,084 | 9/1972 | LeBlanc | 52/514 |
| 3,850,718 | 11/1974 | Trapani | 156/94 |
| 3,866,376 | 2/1975 | Nelsson | 428/538 X |

FOREIGN PATENT DOCUMENTS 1098104  1/1968  United Kingdom ............. 156/94

Primary Examiner—Henry F. Epstein
Attorney, Agent, or Firm—Cook, Wetzel & Egan Ltd.

[57] ABSTRACT

An improved laminate patch for repair of an opening in the facing surface of an interior wall or in a hollow door surface and having a thin, relatively rigid, and a noncombustible plate disposable over such opening, adhesive means applied to such plate at one side thereof for holding the plate in intimate proximity to the surface, and plate cover means applied to the opposite side of and covering such plate to form a smooth and substantially planar configuration with the wall surface.

9 Claims, 3 Drawing Figures

LAMINATE PATCH

BACKGROUND OF THE INVENTION

The present invention generally concerns the plaster and drywall art and more particularly pertains to an improved laminate patch for repairing a hole in an interior wall surface from the facing surface thereof.

There has long been a need in the art for inexpensive wall repair systems, which are relatively uncomplicated and which may be utilized by the non-professional, such as the homeowner. Prior art devices have generally been disposable in the interior of the wall and have functioned to serve as backing plates for plaster or other wall repair materials. The prior art devices have been adequate in their functioning for that purpose. However, many such devices have been unduly complicated in structure, and hence expensive to produce and complicated to use.

Accordingly, in view of the shortcomings of the prior art, it is an object of the improved laminate patch of the present invention to provide an inexpensive, relatively uncomplicated, and fireproof patch for applying on the surface of an interior wall having a hole therein to be repaired.

It is an additional object of the improved laminate patch of the present invention to provide a patch which is applied directly on the facing surface of the interior wall, and hence requires no support from the opposite wall.

It is a further object of the improved laminate patch of the present invention to provide a patch which will provide a smooth transition between the wall surface and that of the wall repair compound applied over the laminate patch to complete the repair.

It is a yet further object of the improved laminate patch of the present invention to provide a patch which may be easily cut by scissors or other means for fitting around a miscut switch plate or light fixture hole, or a pipe projecting from the wall surface to seal the wall, especially from the elements and/or insects.

These and other objects and advantages of the improved laminate patch of the present invention will become apparent to one skilled in the art upon review of the following description and drawing.

SUMMARY OF THE INVENTION

The improved laminate patch of the present invention is particularly suitable for closing an opening on the facing surface of an interior wall by means of a thin plate of non-combustible material. For purposes of the present invention, the term "wall surface" includes the facing surfaces of both vertical walls and ceilings, and whether made of drywall, plaster or other wall material. The thin plate has on one side thereof a central portion for covering the opening to be closed in the wall surface. A periphery surrounds the central portion on the thin plate, and when disposed into intimate proximity with the wall surface is held thereagainst by means of an adhesive.

A plate cover means is laminated at the interior surface thereof to the outer side of the thin plate for covering it and for extending over and smoothly covering the edge portions thereof. The repair is then completed by applying plaster, spackle or other wall repair compound over the exterior surface of the laminate patch to effect a smooth and substantially planar surface.

The thin plate is made of a non-combustible material, preferably thin gauge aluminum sheeting, which may easily be cut by scissors. The adhesive coating for bonding the thin plate to the wall surface is preferably a two-sided adhesive tape, although pressure sensitive adhesive compounds may be applied directly to the thin plate. The plate cover material preferably comprises a fibrous material with an exterior surface of porosity sufficient to be bonded to a wall finishing compound to complete the repair. Paper or fabric are examples of such a material.

The plate cover includes an outer margin which extends over the edge portions of the thin plate preferably for a substantial distance and bears an adhesive on the inner surface thereof for bonding the plate cover directly to the wall surface to provide a substantially planar configuration with respect to the wall surface for receiving a thin coating of plaster to effect a smooth and invisible repair.

DETAILED DESCRIPTION OF THE PREFERRED EMBODIMENTS

Figure 1:
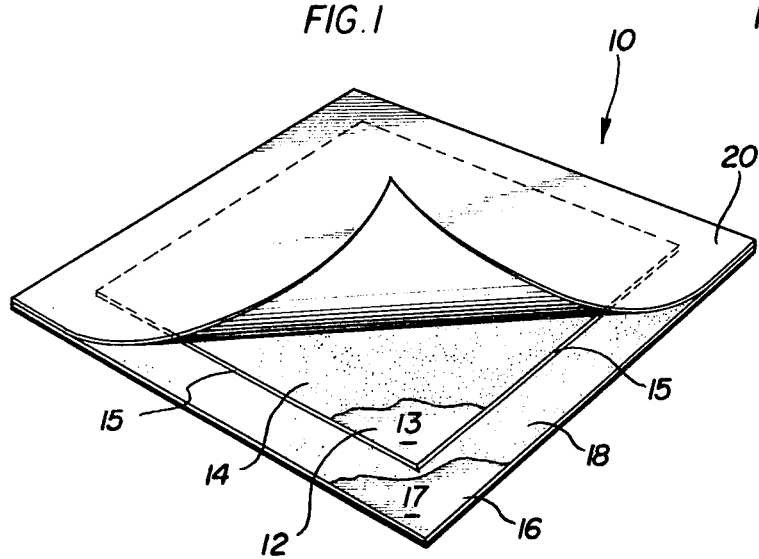
FIG. 1 is a perspective view of the improved laminate patch of the present invention, including a thin plate having adhesive on the inner surface thereof and backed by plate cover means bearing an adhesive on the inner surface thereof, the patch covered with removable release paper, shown peeled partially away.

Referring now to the drawing and FIG. 1 in particular, the improved laminate patch of the present invention, shown generally at 10, is formed from a thin and relatively rigid plate 12 which is made of a non-combustible material, preferably thin gauge aluminum sheeting. Aluminum sheeting is most suitable because of its relatively light weight and because aluminum may be easily trimmed to size or may have a hole cut therein to accommodate and seal a pipe extending from the wall surface. Aluminum sheeting also is easily bent to repair a hole at a wall corner.

Plate 12 is covered at least in part by an adhesive coating 14 for firmly bonding plate 12 at its interior side 13 into intimate proximity to the wall surface 11 to be repaired. A plate cover 16 is laminated on the interior surface 17 thereof to the exterior side of plate 12 to cover the plate 12 and to form a smooth transition from plate 12 over the edges 15 thereof and onto wall surface 11. Plate cover 16 has a preferably presssure sensitive adhesive layer 18 applied to the interior surface 17 thereof to bond plate cover 16 to wall surface 11. A release coated film 20 may be applied to the improved laminate patch 10, which film 20 is to be stripped away prior to use.

Figure 2:
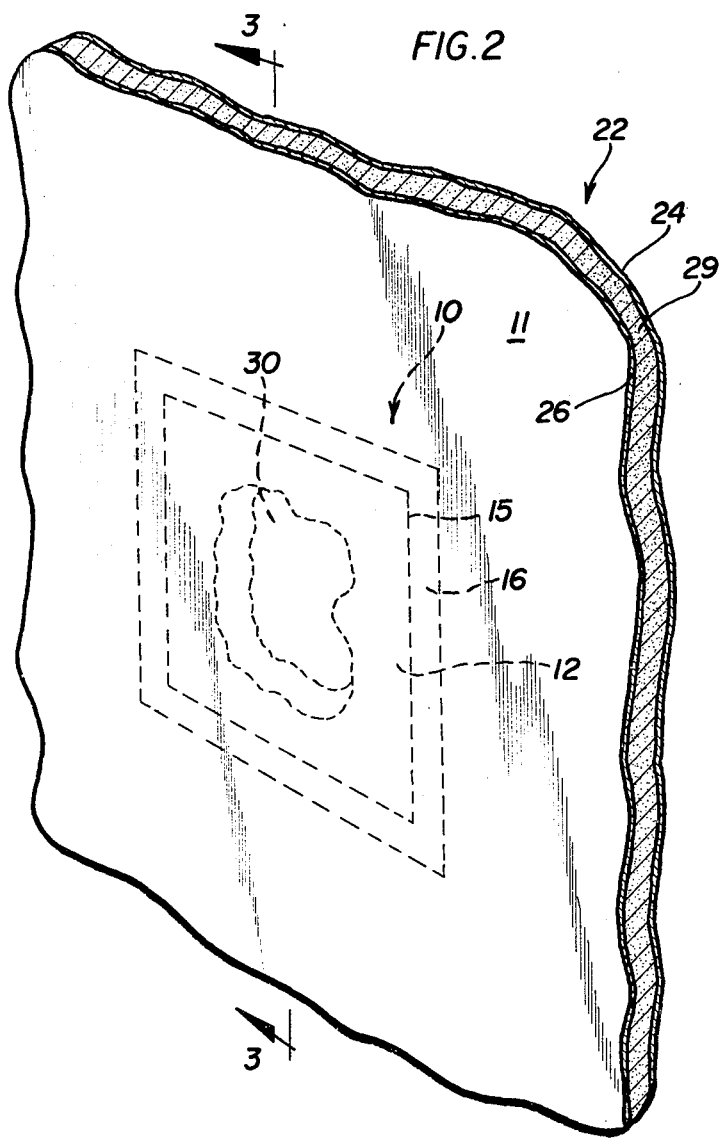
FIG. 2 is a perspective view of a section of drywall, showing in phantom lines the improved laminate patch of the present invention disposed thereon and covering and repairing a hole in the drywall.

Referring now to FIG. 2, improved laminate patch 10 is shown disposed on a section of drywall generally designated at 22, and comprising paper layers 24, 26 sandwiching a plaster layer 29. Plate 12 and plate cover 16 are shown in phantom covering the hole or opening 30 to be repaired.

Figure 3:
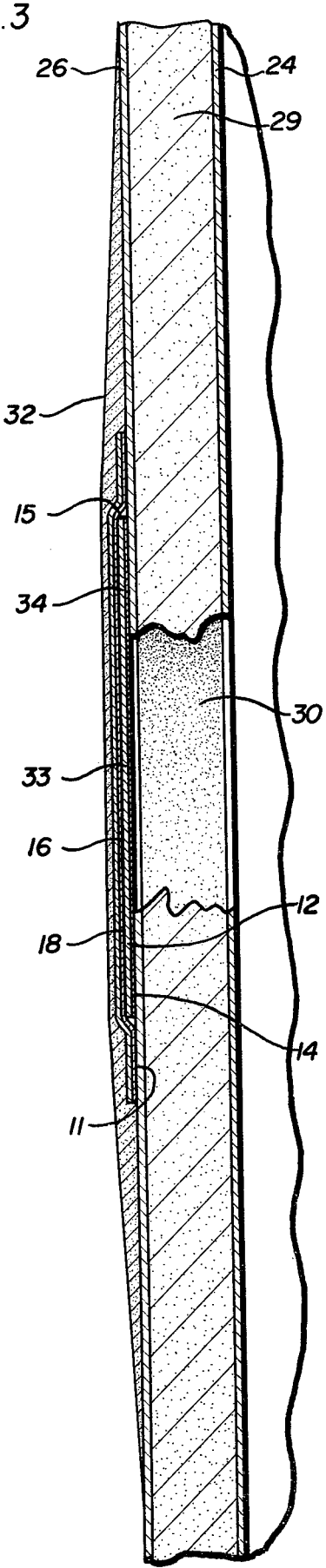
FIG. 3 is an enlarged cross-sectional view taken along line 3—3 of FIG. 2, showing the improved laminate patch of the present invention applied to the exterior surface of the drywall to repair a hole therein, and including a thin plate disposed over the opening to be closed, adhesive disposed on at least the periphery of the thin plate for firmly bonding it to the drywall surface, a plate cover laminated to the exterior side of the thin plate for extending over the edge portions thereof to form a generally smooth and planar configuration with respect to the drywall surface, and further showing a wall repair compound, such as plaster or spackle, applied over the entirety of the improved laminate patch to complete the repair.

Referring now to FIG. 3, improved laminate patch 10 is shown applied to repair hole 30 in drywall 22, and when installed is covered by a thin layer of plaster, spackle or other wall repair compound 32. Plate 12 has a central portion 33 on interior side 13 thereof for covering opening 30 in drywall section 22, and a periphery 34 on interior side 13 thereof for disposition into intimate proximity with drywall surface 11 and is bordered by edges 15. Adhesive coating 14 is disposed on interior side 13 of plate 12 over at least a substantial portion of the periphery thereof and alternatively over the entire interior surface 13 of plate 12 for firmly bonding plate 12 to drywall surface 11 to be repaired. The plate cover 16 is laminated at the interior surface 17 thereof to the exterior side of plate 12 for covering plate 12 and for extending over the edges 15 of plate 12 to form the smooth transition between plate 12 and wall surface 11.

The improved laminate patch 10 of the present invention is used by removing the stripable, release coated backing 20 and applying patch 10 with pressure over the hole or opening 30 in wall surface 11. After plate 12 and plate cover 16 have been pressed firmly against wall surface 11, plaster, spackle or other wall repair compound is applied over patch 10 to complete the repair. The result is a smooth and planar wall surface. The improved laminate patch of the present invention is safe and easy to use and relatively inexpensive to manufacturer.

The improved laminate patch 10 of the present invention may be used to repair a variety of different types of holes in a wall surface, including for example, the hole around a pipe disposed through and projecting from the wall surface, a hole caused by wall damage, a miscut switch plate hole or light fixture hole. Improved laminate patch 10 may also be used in the same manner to repair a hole in a hollow door structure commonly manufactured of Masonite material.

Although the improved laminate patch of the present invention may be generally of any size or shape, generally a dimension of eight inches by eight inches will be large enough to cover any usually encountered holes. The aluminum sheeting used may be of any suitable gauge which is sufficiently rigid to serve as a backing for the wall finishing compound, such as plaster or spackle, but which is sufficiently light in gauge to have a thinness which does not protrude excessively from the wall surface. The paper and adhesives used may be of various types, although one paper which has been particularly successful for the plate cover has been "Fasson" made by Avery International, which is a paper coated with a pressure sensitive adhesive. The adhesive for coating the plate may be double-faced carpet tape in one preferred embodiment.

The basic and novel characteristics of the improved laminate patch of the present invention and the advantages thereof will be readily understood from the foregoing disclosure by those skilled in the art. It will become readily apparent that various changes and modifications may be made in the form, construction and arrangement of the elements thereof as set forth hereinabove without departing from the spirit and scope of the invention. Accordingly, the preferred and alternative embodiments of the present invention set forth hereinabove are not intended to limit such spirit and scope in any way.

What is claimed is:

1. An improved laminate patch for closing an opening in an interior wall surface comprising:
   a thin and relatively rigid non-combustible plate of aluminum sheeting having a first side with a central portion for covering the opening to be closed in the surface, a periphery for disposition in intimate proximity to the surface, and bordered by edge portions, said thin plate having a second side opposite the first side;
   adhesive coating means disposed on the first side of said thin plate and on at least a substantial portion of the periphery thereof for firmly bonding the periphery in intimate proximity to the wall surface; and
   plate cover means of fibrous material laminated at the interior surface thereof to the second side of said thin plate for covering said thin plate and for extending over the edge portions thereof to dispose the exterior surface of said cover means in substantially planar configuration with the wall surface, said thin plate cover means having an exterior surface adapted for receiving a wall finishing compound thereon and said interior surface of said plate cover means having an adhesive thereon.

2. The improved laminate patch of claim 1 wherein said adhesive coating means comprises a fibrous substrate bearing an adhesive on both the front and back surfaces thereof.

3. The improved laminate patch of claim 2 wherein the adhesive is a pressure sensitive adhesive.

4. The improved laminate patch of claim 1 wherein said plate cover means is laminated to said thin plate means by an adhesive.

5. The improved laminate patch of claim 4 wherein the adhesive is a pressure sensitive adhesive.

6. The improved laminate patch of claim 1 wherein said plate cover means comprises a fibrous material having an exterior surface of porosity sufficient to receive and bond thereto a wall finishing compound.

7. The improved laminate patch of claim 6 wherein the fibrous material comprises paper.

8. The improved laminate patch of claim 1 wherein said plate cover means includes an outer margin extending over the edge portions of said thin plate for a substantial distance, the interior surface of the outer margin of said plate cover means bearing an adhesive for bonding the outer margin to the wall surface, whereby the edge portions of said thin plate are smoothly covered.

9. The improved laminate patch of claim 1, wherein the wall surface has at least one pipe projecting therefrom, further including at least one aperture in the laminate patch for containing each such pipe, whereby the wall surface around the projecting pipes may be sealed from the elements and/or insects.

* * * * *